T. GRUNDMANN.
Apparatus for Making Vinegar.
No. 57,894.
Patented Sept. 11, 1866.
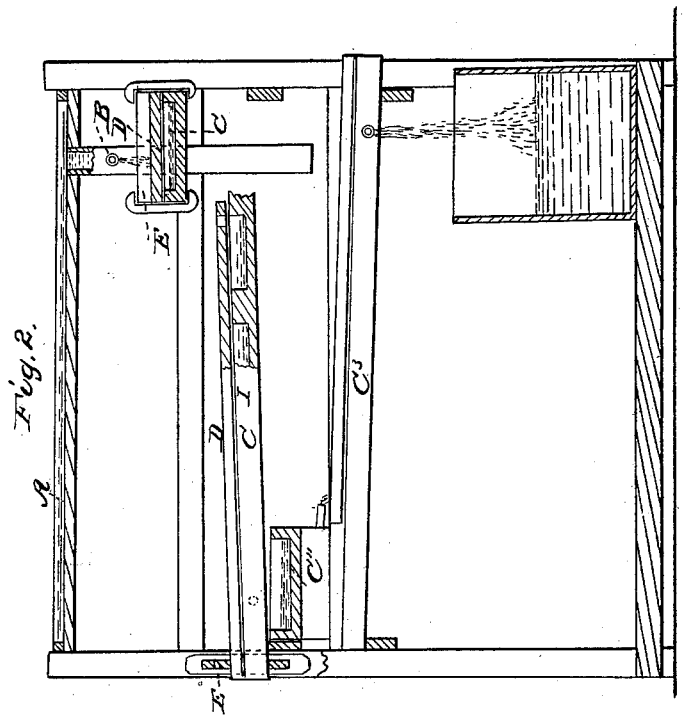
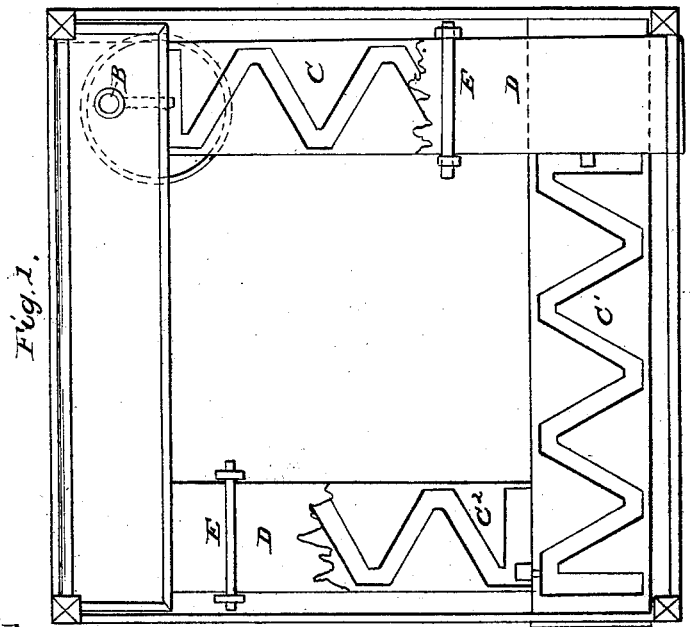

UNITED STATES PATENT OFFICE.

THEODORE GRÜNDMANN, OF ST. ANTHONY, MINNESOTA.

IMPROVED APPARATUS FOR MAKING VINEGAR.

Specification forming part of Letters Patent No. 57,894, dated September 11, 1866.

*To all whom it may concern:*

Be it known that I, THEODORE GRÜNDMANN, of St. Anthony, in the county of Hennepin and State of Minnesota, have invented a new and Improved Apparatus for Making Vinegar; and I do hereby declare that the following is a full, clear, and exact description thereof, which will enable others skilled in the art to make and use the same, reference being had to the accompanying drawings, forming part of this specification, in which—

Figure 1 represents a plan or top view of this invention. Fig. 2 is a longitudinal vertical section of the same.

Similar letters of reference indicate like parts.

This invention relates to an apparatus in which the liquid which is to be transformed into vinegar is made to pass through a series of troughs, which are placed in a slightly-inclined position and covered up, leaving air-channels, which allow the atmospheric air to circulate freely over the surface of the liquid passing through the troughs in such a manner that if said troughs are first saturated with vinegar, and beer, cider, or other suitable liquid is passed through them, said liquid is transformed into vinegar, and all danger of overheating and putrefaction is avoided.

A represents a flat tank or vat, which contains the liquid to be transformed into vinegar. From this tank extends a pipe, B, from which the liquid is distributed to the several series of troughs, each of which is composed of four (more or less) troughs, C C' C'' C''', as shown in the drawings. These troughs are placed in a slightly-inclined position, and they are so situated that the liquid, on discharging from the pipe B, passes first in the upper trough, C, and after passing through the same it discharges into the upper part of the trough C', and from this trough to the next, and so on until it discharges from the lowest end of the bottom trough.

The channels which form the several troughs may be cut in a zigzag or in a serpentine course, as shown in the drawings; or said channels may be arranged in any other suitable manner to obtain the greatest possible length in a small compass.

The troughs C C' C'', &c., are provided with covers D D', &c., and these covers are held in position by clamps E, which are made of wood or any other suitable material, and which may be constructed in any desirable manner. Each of the covers is provided with a hole, a, through which the liquid is admitted, and through these holes and the discharge-pipes at the lowest ends of the troughs the air circulates freely, so that the required quantity is brought in contact with the liquid passing through the troughs.

At the beginning of the operation the troughs are saturated with hot vinegar, and after a few days a mother of vinegar is formed, and if beer, cider, or other liquid is passed through the troughs, said liquid is rapidly transformed into vinegar.

From the lowest trough the vinegar is collected in a suitable vessel, F, and if, from some cause, the liquid should fail to be completely acidified when running off from the lowest trough, it can be passed through the troughs a second time.

By this apparatus such liquids which contain much gluten—such as beer or cider—can be readily transformed into vinegar, whereas with apparatus of the ordinary construction, in which the liquid to be acidified is passed through vats filled with shavings, corn-cobs, or other suitable material, such liquids—as, for instance, beer or cider—cannot be transformed into vinegar, because the gluten contained in said liquids deposits too much mother of vinegar in the shavings, corn-cobs, or other material, and thereby the free access of air is prevented, the heat in the vats rises beyond the desired point, and putrefaction takes place.

This difficulty is entirely avoided by the use of my apparatus, which is cheap and durable in its construction, easily operated, and readily put up in a comparatively small space.

What I claim as new, and desire to secure by Letters Patent, is—

The arrangement of a series of troughs or channels, C C' C'', &c., provided with covers, through which the liquid to be acidified, and also a sufficient quantity of air to produce acidification, is admitted, substantially as and for the purpose described.

THEODORE GRÜNDMANN.

Witnesses:
J. C. WILLIAMS,
S. M. WILLIAMS.